United States Patent
Watanabe et al.

(10) Patent No.: US 7,643,905 B2
(45) Date of Patent: Jan. 5, 2010

(54) ROBOT PROGRAM CORRECTING APPARATUS

(75) Inventors: Atsushi Watanabe, Tokyo (JP);
Yoshiharu Nagatsuka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 611 days.

(21) Appl. No.: 11/279,348

(22) Filed: Apr. 11, 2006

(65) Prior Publication Data
US 2007/0299557 A1 Dec. 27, 2007

(30) Foreign Application Priority Data
Apr. 13, 2005 (JP) ............................. 2005-115841

(51) Int. Cl.
*G05B 19/04* (2006.01)
(52) U.S. Cl. .................. 700/253; 700/245; 700/247; 700/249; 700/256; 700/264; 318/568.1; 318/568.11; 318/568.12; 318/568.13; 318/568.19; 901/1; 901/3; 901/6; 901/15; 901/49
(58) Field of Classification Search ............ 700/245, 700/247, 249, 256, 53, 264, 253; 318/568.1, 318/568.11, 568.12, 568.13, 568.19, 400.02; 901/1, 3, 6, 15, 49; 345/135
See application file for complete search history.

(56) References Cited

U.S. PATENT DOCUMENTS

| | | | | |
|---|---|---|---|---|
| 4,901,218 | A * | 2/1990 | Cornwell | 700/2 |
| 6,167,325 | A * | 12/2000 | Kamiguchi et al. | 700/183 |
| 6,775,586 | B2 * | 8/2004 | Shibata et al. | 700/189 |
| 7,149,602 | B2 * | 12/2006 | Watanabe et al. | 700/245 |
| 7,181,315 | B2 * | 2/2007 | Watanabe et al. | 700/264 |
| 7,376,488 | B2 * | 5/2008 | Watanabe et al. | 700/264 |
| 7,532,949 | B2 * | 5/2009 | Ban et al. | 700/245 |
| 2003/0090483 | A1 * | 5/2003 | Watanabe et al. | 345/419 |
| 2004/0199288 | A1 * | 10/2004 | Watanabe et al. | 700/245 |
| 2005/0107918 | A1 * | 5/2005 | Watanabe et al. | 700/245 |
| 2005/0107920 | A1 * | 5/2005 | Ban et al. | 700/245 |

(Continued)

FOREIGN PATENT DOCUMENTS

JP 5019840 A 1/1993

OTHER PUBLICATIONS

Notice of Reasons for Rejection for JP2005-115841 mailed Nov. 20, 2007.

*Primary Examiner*—Khoi Tran
*Assistant Examiner*—McDieunel Marc
(74) *Attorney, Agent, or Firm*—Lowe Hauptman Ham & Berner, LLP (57) ABSTRACT

A robot program correcting apparatus, which displays three-dimensional models of a robot and a workpiece simultaneously on the screen of a display apparatus, and corrects an operation program for the robot, includes: a unit retrieving a robot operation program and a working position based on at least either a line or a surface computed from touchup points and on a touchup position or points representing a working position specified on the screen; a difference computing unit computing a difference between at least either the line or surface computed from the touchup points and at least either a line or a surface computed from the plurality of points as position information representing the retrieved working position; and a correcting unit correcting the robot operation program by computing the amount of correction based on the difference, thereby reducing the number of steps required when correcting the robot operation program.

10 Claims, 7 Drawing Sheets

U.S. PATENT DOCUMENTS

2005/0159842 A1* 7/2005 Ban et al. ................... 700/245
2005/0206918 A1* 9/2005 Egawa et al. ................. 358/1.7
2006/0030970 A1* 2/2006 Watanabe et al. ........... 700/248
2008/0300723 A1* 12/2008 Ban et al. ................... 700/259

* cited by examiner

○ TEACH POINT

Fig.8

ROBOT PROGRAM CORRECTING APPARATUS

CROSS-REFERENCE TO RELATED APPLICATION

This application is based upon and claims the priority of Japanese Patent Application No. 2005-115841, filed Apr. 13, 2005, the contents being incorporated herein by reference.

BACKGROUND OF THE INVENTION (1) Field of the Invention

The present invention relates to a robot program correcting apparatus and, more particularly, to a robot program correcting apparatus for correcting a robot operation program, created off-line, to make it match the actual working position in the field.

(2) Description of Related Art

When a robot operation program is created in an off-line robot system and applied in the field, if the off-line-created program is executed without any modification, the robot cannot perform the work, as planned off-line, because there is a discrepancy between the off-line world and the world in the field. Accordingly, correction must be made to address this discrepancy.

In the prior art, teaching has been performed by jogging the robot in the field and a correction made to the off-line created program so as to match the actual position. Jogging the robot means moving the robot in order to teach it the actual working position.

Then, when applying the off-line created program in the field, it has been practiced to operate the robot in the field to touch up the target position on the workpiece that corresponds to the taught position defined on the screen, and to correct the program by shifting the target position by multiplying the target position from the right by a unitary difference matrix of four rows and four columns obtained as the difference between the points representing the target position and the points representing the actually touched position, thereby accomplishing the teaching and correction a position where a displacement has occurred.

SUMMARY OF THE INVENTION

With the prior art method, that shifts the target position by multiplying the target position from the right only by a unitary difference matrix obtained as the difference between the points, good correction accuracy cannot be obtained. As a result, the prior art method requires repeating this correction by jogging the robot, and this has led to the problem that it takes many man-hours to correct the program.

It is an object of the present invention to provide a robot program correcting apparatus that solves the above prior art problem and reduces the number of steps required to correct a robot operation program based on the motion path of the robot defined by the operation program and on the touchup points that the robot has actually touched on the workpiece in the field.

MEANS FOR SOLVING THE PROBLEM

To achieve the above object, there is provided, according to a first mode of the present invention, a robot program correcting apparatus which displays three-dimensional models of a robot and a workpiece simultaneously on a screen of a display apparatus, and corrects an operation program for the robot, comprising: a difference computing unit computing a difference between at least either a line or a surface computed from touchup points and at least either a line or a surface computed from points representing a working position specified on the screen; and a correcting unit correcting the robot operation program by computing the amount of correction based on the difference.

According to a second mode of the present invention, instead of "a difference computing unit computing a difference between at least either a line or a surface computed from touchup points and at least either a line or a surface computed from points representing a working position specified on the screen" used in the first mode, "difference computing unit computing a difference between at least either the line or surface computed from the touchup points and at least either the line or surface computed from the points representing the retrieved working position" is used.

Preferably, the robot program correcting apparatus further comprises: an operation program storing unit storing a plurality of robot operation programs by generating the programs based on positions of the robot and the workpiece arranged on the screen; and a working position specifying unit specifying on the screen a working position at which the robot works on the workpiece arranged on the screen.

Further preferably, the curve and the curved surface are a spline curve and a spline surface, respectively.

Further preferably, the amount of correction for the operation program is obtained by correcting a mechanism model of the robot based on the difference.

Further preferably, the mechanism model of the robot is a D-H parameter.

EFFECT OF THE INVENTION

When applying an off-line created program in the field, a spline curve or a spline surface is created from the working position on the correcting apparatus, and further, a spline curve or a spline surface is created by touching the corresponding touchup points in the field. By comparing the two curves or curved surfaces and obtaining their difference, and by correcting the robot program and the robot's D-H parameters, the accuracy of correction of the robot program increases, and the number of steps required to correct the program in the field is reduced. This serves to simplify the work when applying the off-line created program in the field.

BRIEF DESCRIPTION OF THE DRAWINGS

The above object and features of the present invention will become more apparent from the following description of the best mode for carrying out the present invention given with reference to the accompanying drawings, wherein.

DETAILED DESCRIPTION

Embodiments of the present invention will be described below. Throughout the drawings, the same reference numerals indicate the same parts.

Figure 1:
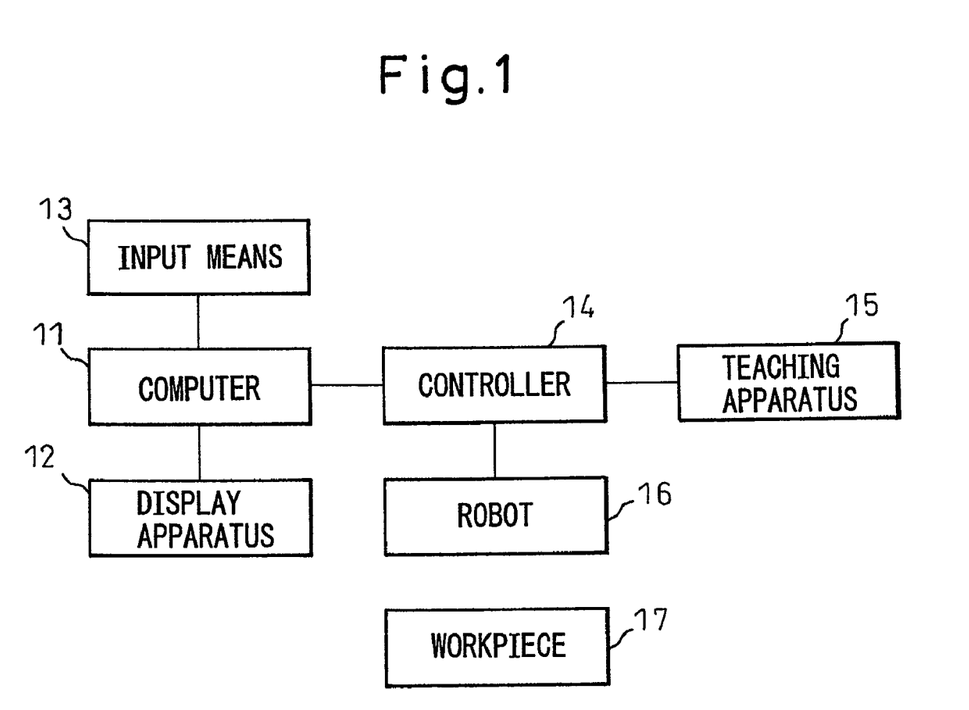
FIG. 1 is a block diagram showing the configuration of a system which includes a robot program correcting apparatus according to the present invention.

FIG. 1 is a block diagram showing the configuration of a system which includes a robot program correcting apparatus according to the present invention. In the figure, reference numeral 11 is a computer such as a personal computer, 12 is a display apparatus connected to the computer 11, and 13 is an input means connected to the computer and implemented by a keyboard, mouse, etc. Further, reference numeral 14 is a controller for controlling the operation of a robot 16 by a robot operation program stored in the computer 11, 15 is a teaching apparatus for teaching the robot its working position via the controller 14 and for installing the robot operation program on the computer 11, 16 is the robot which is controlled by the controller 15, and 17 is a workpiece which is worked on and moved by the robot 16.

The robot program correcting apparatus according to the present invention is implemented by the computer 11.

Images of the robot 17, the workpiece 17 and, if needed, any peripheral device (not shown) are displayed simultaneously as three-dimensional data on the screen of the display apparatus 12.

The teaching apparatus 15 is a portable terminal that an operator uses to specify the operating position and the motion of the robot 16 while viewing the actual motion of the robot or the image of the robot displayed on the screen of the display apparatus 12.

EMBODIMENT 1

Figure 2:
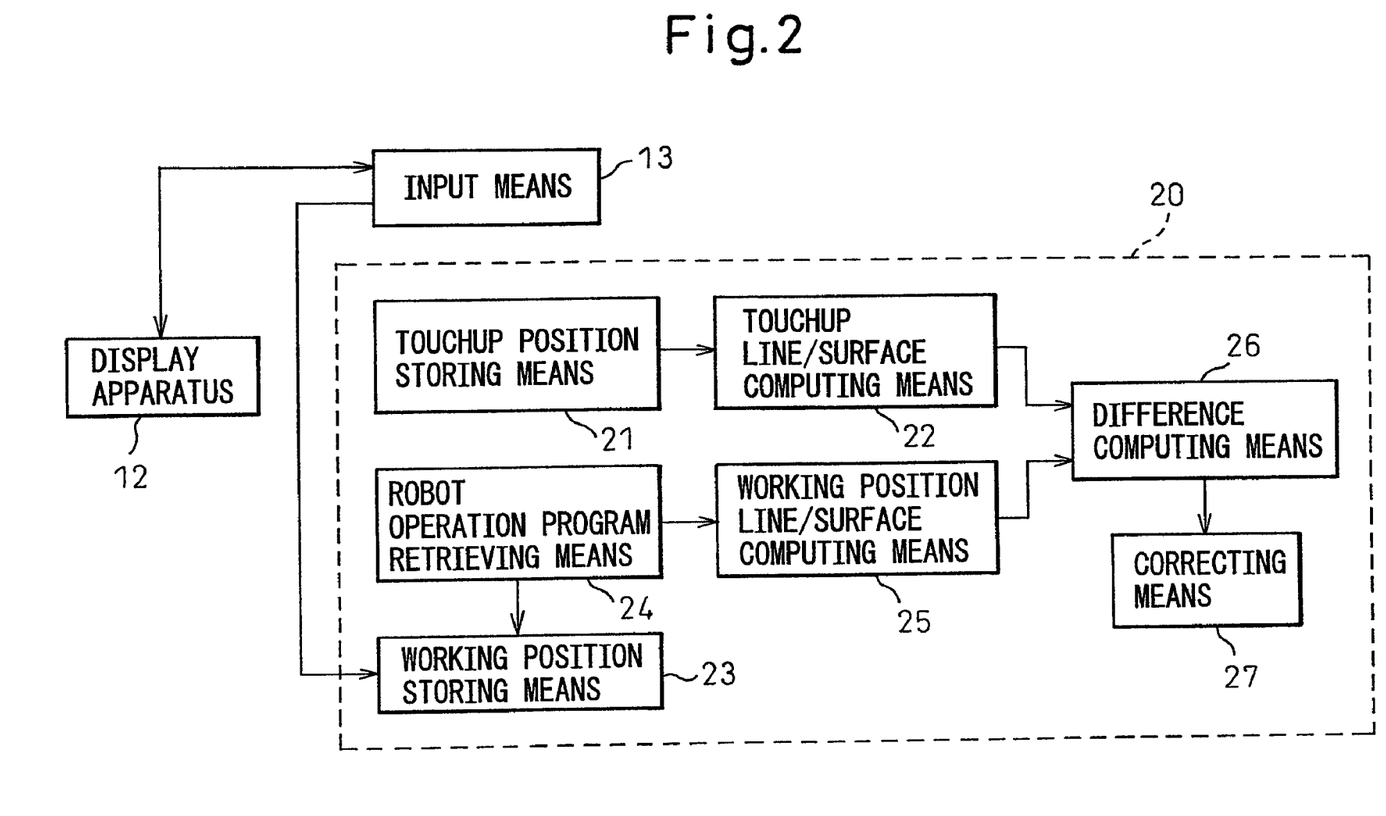
FIG. 2 is a functional block diagram showing the configuration of a robot program correcting apparatus according to a first embodiment of the present invention.

FIG. 2 is a functional block diagram showing the configuration of a robot program correcting apparatus according to a first embodiment of the present invention. In the figure, reference numeral 20 indicates the robot program correcting apparatus connected to the display apparatus 12. The robot program correcting apparatus 20 is implemented by the computer 11, etc. The robot program correcting apparatus 20 displays three-dimensional models of the robot and the workpiece simultaneously on the screen of the display apparatus 12, and corrects the robot operation program. The robot program correcting apparatus 20 comprises: a touchup position storing means 21 for storing, as a plurality of points, an actual position located on the workpiece by actually operating the robot to touch the actual position on the workpiece that corresponds to the working position specified on the screen; a touchup line or touchup surface computing means 22 for computing at least either a line or a surface based on the plurality of touchup points; a working position storing means 23 for storing, as a plurality of points, position information concerning the working position on the workpiece displayed on the screen; a robot operation program retrieving means 24 for retrieving the robot operation program based on the plurality of points stored in the working position storing means 23; a working position line or surface computing means 25 for computing at least either a line or a surface based on a plurality of working positions designated by the robot operation program; a difference computing means 26 for computing the difference between at least either the line or surface computed from the touchup points and at least either the line or surface computed from the points representing the working position specified on the screen; and a correcting means 27 for correcting the robot operation program by computing the amount of correction based on the difference.

EMBODIMENT 2

Figure 3:
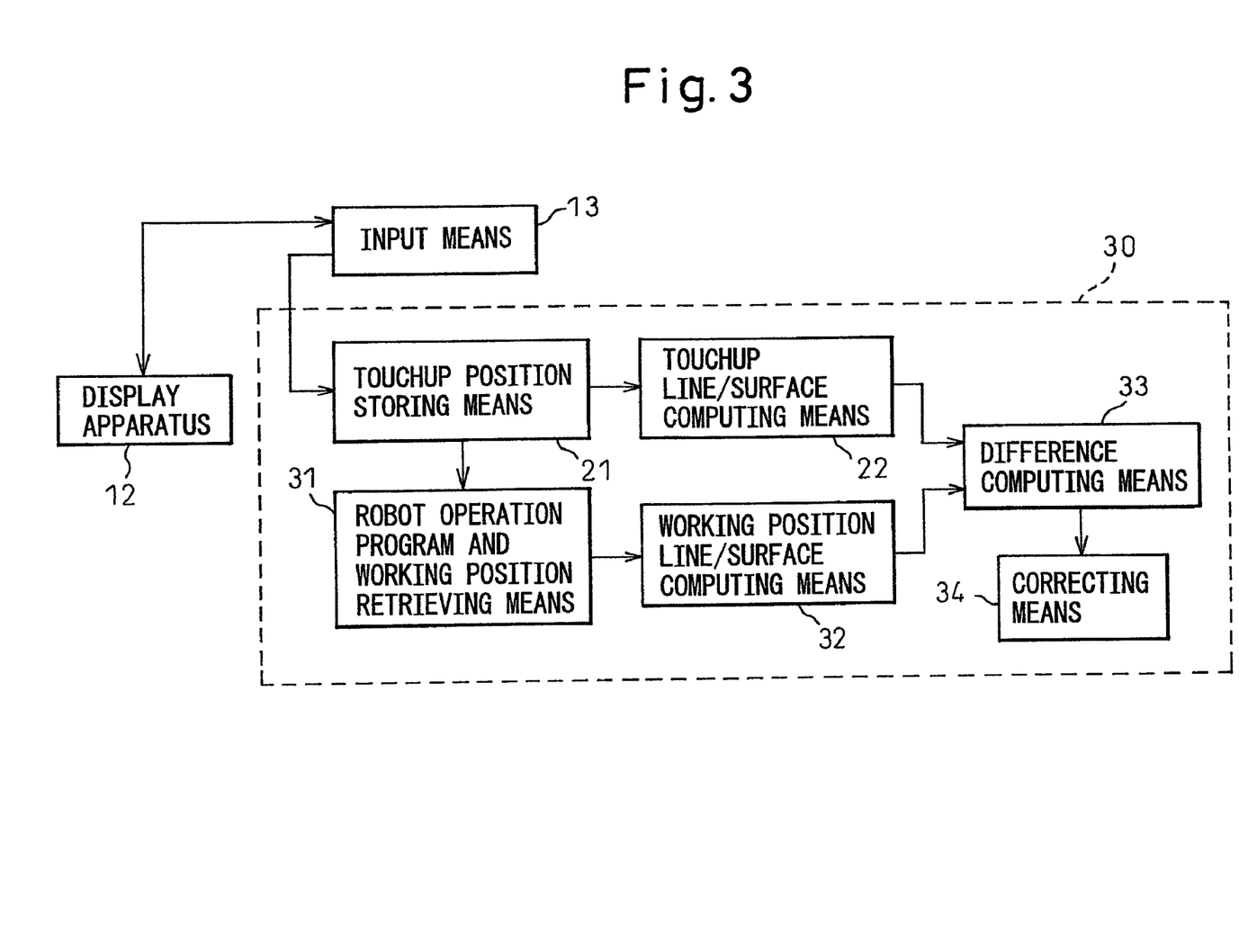
FIG. 3 is a functional block diagram showing the configuration of a robot program correcting apparatus according to a second embodiment of the present invention.

FIG. 3 is a functional block diagram showing the configuration of a robot program correcting apparatus according to a second embodiment of the present invention. In the figure, the difference from FIG. 2 is that, while the working position acquiring means 23 in FIG. 2 acquires as a plurality of points the position information concerning the working position on the workpiece displayed on the screen, the apparatus of FIG. 3 comprises a means 31 for retrieving, based on the touchup position effected by the actual robot, its associated robot operation program and working position, and a working position line or surface computing means 32 for computing at least either a line or a surface based on the robot operation program and working position thus retrieved.

Figure 4:
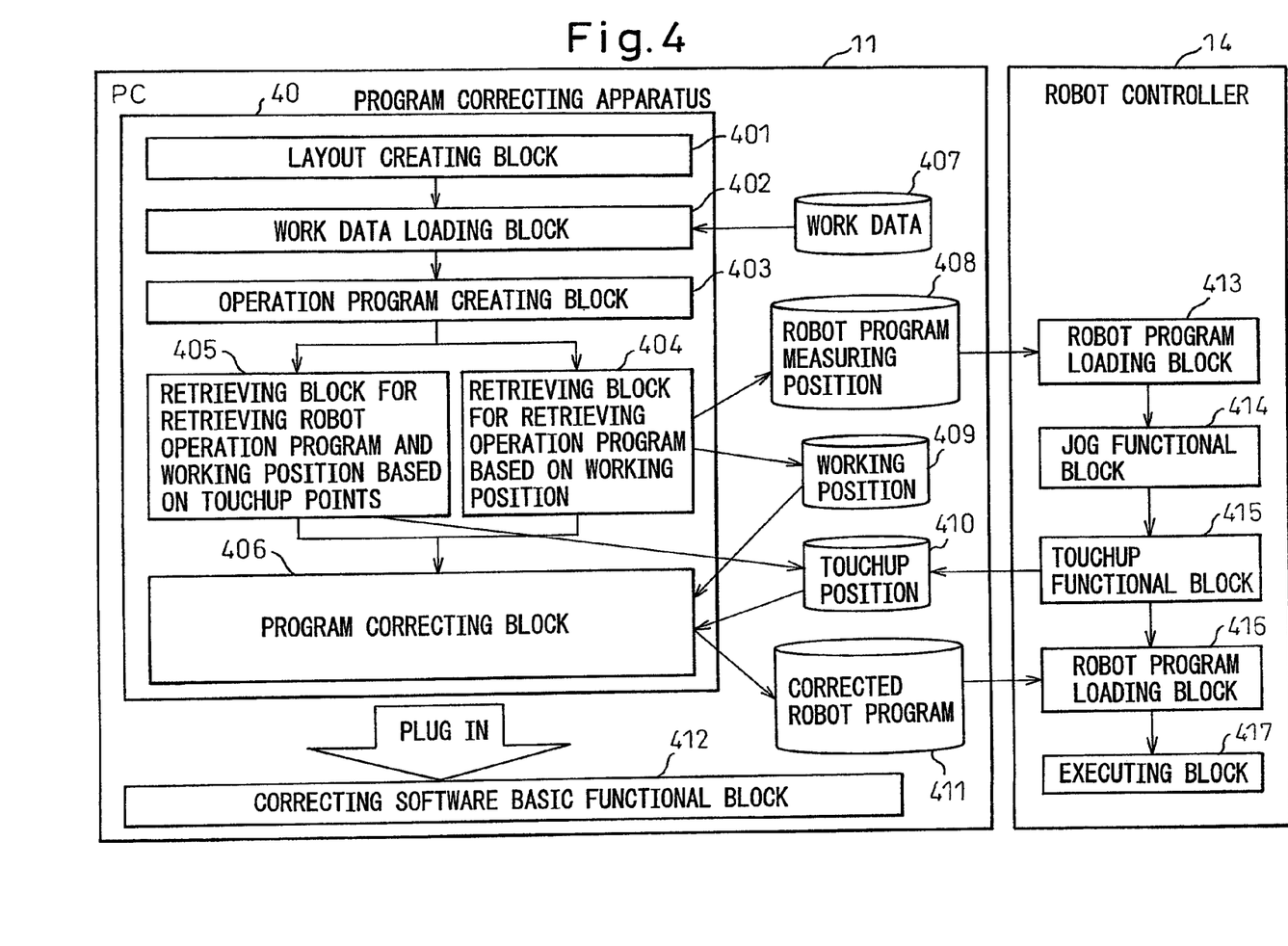
FIG. 4 is a block diagram showing the detailed configuration of the robot program correcting apparatus and a robot controller 14 according to the first and second embodiments.

FIG. 4 is a block diagram showing the detailed configuration of the robot program correcting apparatus and the robot controller 14 according to the first and second embodiments. In the figure, the program correcting apparatus 40 is included in the computer 11. The program correcting apparatus 40 comprises a layout creating block 401, a work data loading block 402, an operation program creating block 403, an operation program retrieving block 404 for retrieving the operation program from the working position in the first embodiment or a retrieving block 405 for retrieving the robot operation program and working position based on the touchup points in the second embodiment, and a program correcting block 406.

The computer 11 further includes a work data storing block 407 for storing data concerning the workpiece 17, a robot program measuring position storing block 408, a working position storing block 409, a touchup position storing block 410, a corrected robot program storing block 411, and a correcting software basic functional block 412. The program correcting apparatus 40 is plugged into the correcting software basic functional block 412.

The robot controller 14 comprises a robot program loading block 413 for loading the robot program corresponding to the measuring position stored in the robot program measuring position storing block 408, a jog functional block 414 for jogging the robot in accordance with the thus loaded program, a touchup functional block 415 for teaching the touchup position on the work to the touchup position storing block 410, a robot program loading block 416 for loading the corrected robot program, and an executing block 417 for executing the corrected robot program thus loaded.

Correspondences between the functional block diagrams shown in FIGS. 2 and 3 and the detailed configuration shown in FIG. 4 are described below.

The touchup position storing means 21 in FIGS. 2 and 3 corresponds to the touchup position storing block 410 in FIG. 4. The working position storing means 23 in FIG. 2 corresponds to the working position storing block 409 in FIG. 4. The robot operation program retrieving means 24 in FIG. 2 corresponds to the operation program retrieving block 404 in FIG. 4. The robot operation program and working position retrieving means 31 in FIG. 3 corresponds to the retrieving block 405 in FIG. 4. The touchup line or touchup surface computing means 22, the difference computing means 26, and the correcting means 27 in FIG. 2 and the working position line or the surface computing means 32, the difference computing means 33, and the correcting means 34 in FIG. 3 together correspond to the program correcting block 406 in FIG. 4.

Figure 5:
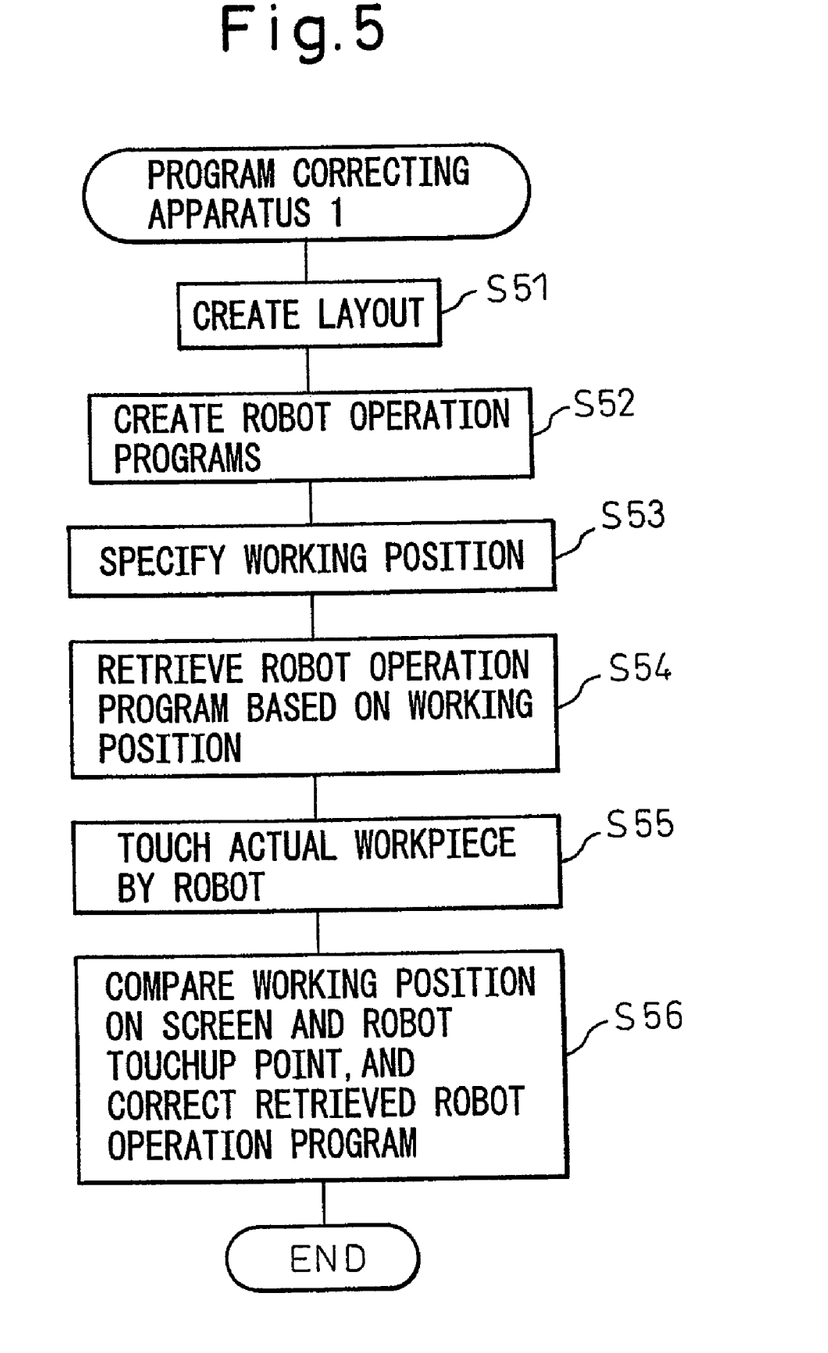
FIG. 5 is a flowchart for explaining the operation of the robot program correcting apparatus according to the first embodiment shown in FIG. 4.

FIG. 5 is a flowchart for explaining the operation of the robot program correcting apparatus according to the first embodiment shown in FIG. 4. In the flowchart, the layout creating block 401 in step S51 creates a layout by arranging three-dimensional data of the robot 16, the workpiece 17 and, if needed, any peripheral device (not shown) on the screen of the display apparatus 12. Work data relating to the image of the workpiece thus arranged is loaded into the working data loading block 402 from the work data storing block 407.

Next, in step S52, a plurality of robot operation programs for the images of the robot and the workpiece arranged on the screen of the display apparatus 12 are created using known techniques.

In step S53, using the teaching apparatus 15, the operator specifies a working position on the images of the workpiece and the robot displayed on the screen of the display apparatus 12. This can be accomplished by a number of methods, for example, by moving a cursor to the working position by a mouse and clicking on it, or by displaying all working positions on the screen and making a selection from them. The specified working position is stored in the working position storing means 23 (working position storing block 409).

Next, in step S54, the robot operation program closest to the working position specified in step S53 is retrieved by searching through the robot operation programs created in step S52.

Then, in step S55, the actual robot 16 is operated to touch the position on the actual workpiece 17 corresponding to the specified working position, and the touchup position is stored in the actual work position storing means 21 (touchup position storing block 410).

Finally, in step S56, the line or surface of the working position stored in the working position storing means 23 (working position storing block 409) and displayed on the screen and the line or surface of the touchup points stored in the touchup position storing means 21 (touchup position storing block 410) are computed by the working position line or surface computing means 25 and the touchup line or touchup surface computing means 22, respectively, and the difference between them is computed by the difference computing means 26; then, the robot operation program retrieved in step S54 is corrected based on the difference.

Figure 6:
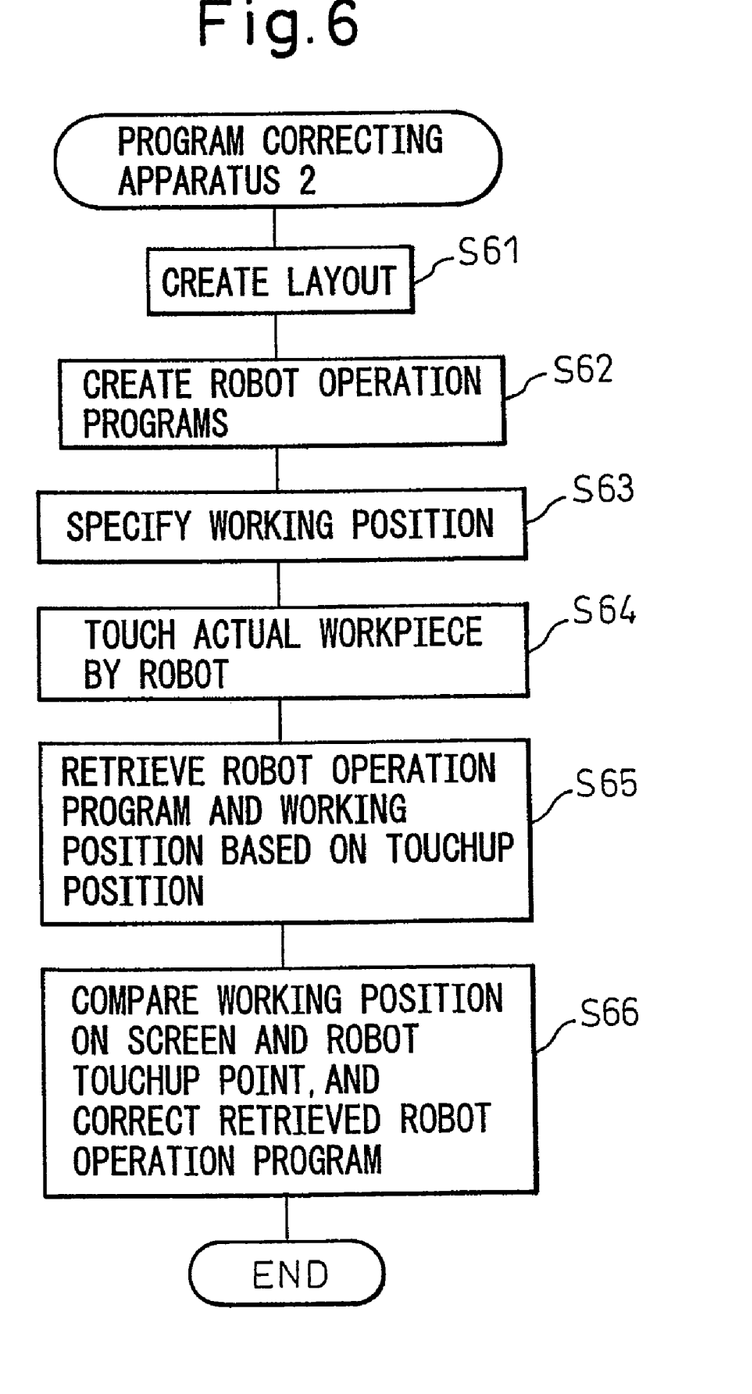
FIG. 6 is a flowchart for explaining the operation of the robot program correcting apparatus according to the second embodiment shown in FIG. 4.

FIG. 6 is a flowchart for explaining the operation of the robot program correcting apparatus according to the second embodiment shown in FIG. 4. In the flowchart, the difference from the flowchart of FIG. 5 is that while, in FIG. 5, the robot operation program is retrieved in step S54 based on the working position on the screen, in FIG. 6 the robot operation program and working position closest to the touchup position effected by the actual robot are retrieved in step S65; the other steps are the same as the corresponding steps in FIG. 5, and the description thereof will not be repeated here.

Figure 7:
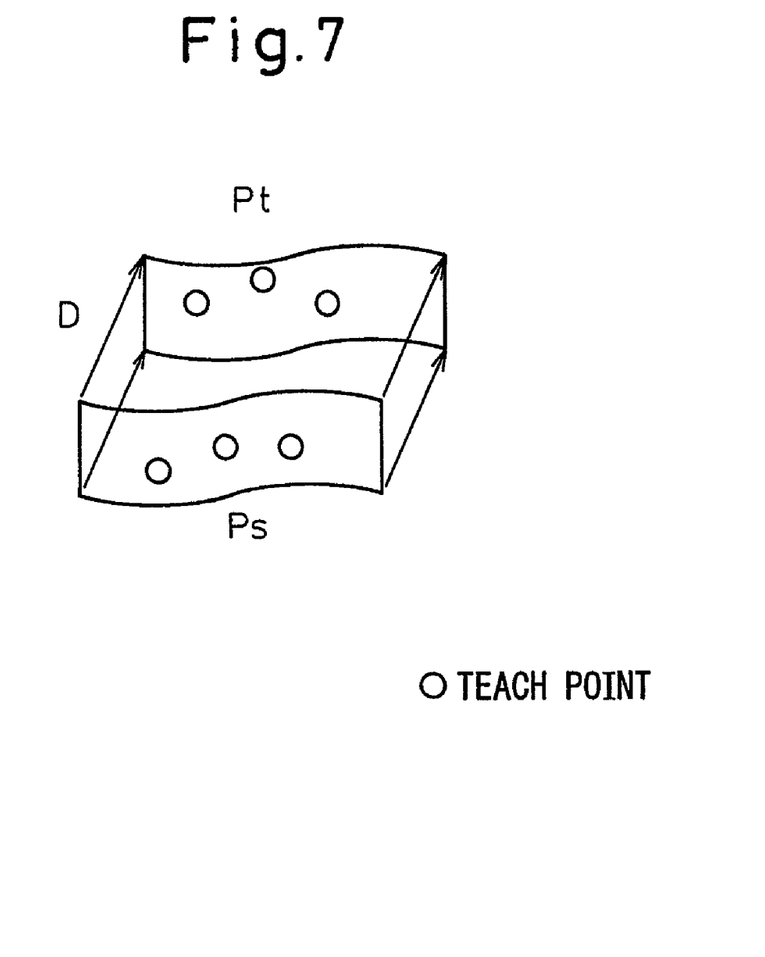
FIG. 7 is a diagram showing a working surface Ps displayed on the screen of a display apparatus 12 and its corresponding working surface (touchup surface) Pt touched by an actual robot 16.

FIG. 7 is a diagram showing a working surface Ps displayed on the screen of the display apparatus 12 and its corresponding working surface (touchup surface) Pt touched by the actual robot 16. As shown, generally, the working surface Ps on the screen is displaced from the touchup surface Pt by a vector D. Open circles indicate teach points; since the teach points specified on the screen are displaced from the teach points taught to the actual robot, the robot operation program is corrected by the above means to compensate for the displacement.

Next, a specific method of correction for the robot operation program will be described.

First, from working positions Qsj on the screen, a working surface Ps(u,w) is computed using a matrix Nij so that the surface becomes a spline surface as defined by the following equation. Here, the subscript s in Qsj denotes "surface" representing the three-dimensional surface position of the working surface, and j denotes an index to the working point on the working surface. Further, u and w are parameters each of which takes a value from 0 to 1.

$Ps(u,w)=\Sigma Nij(t)Qsj$

Similarly, from touchup points Qtj, a touchup surface Pt(u,w) is computed so that the surface becomes a spline surface.

Next, a difference unit normal vector e(u,w) and an offset distance d are computed using the following equations.

Difference D(u,w) between the two surface is $D(u,w)=Ps(u,w)-Pt(u,w)$ $e(u,w)=D(u,w)/|D(u,w)|$ $d=|D(u,w)|$ Next, each teach point Pr(i) of the robot operation program, created on the screen, is corrected as shown below in accordance with the above difference vector.

Transform matrix=(n, o, a, D(u,w))
n=(1, 0, 0)
o=(0, 1, 0)
a=(0, 0, 1)

Here, n, o, and a are parameters usually used in a link coordinate system in robotics to define the position and orientation of the end of a robot arm, and denote "normal", "orient", and "approach", respectively. Further, D(u,w) is the difference vector obtained by the above equation, and represents the location.

In the first embodiment, the teach point Pn(i) after the transform is $Pn(i)=MPr(i)$ and in the second embodiment $Pn(i)=XPr(i)$ where the matrix X is $$X = R(e, \alpha)$$

$$= \begin{matrix} e_x^2 V_\alpha + C_\alpha & e_x e_y V_\alpha - e_z S_\alpha & e_x e_y V_\alpha + e_y S_\alpha \\ e_x e_y V_\alpha + e_z S_\alpha & e_y^2 V_\alpha + C_\alpha & e_y e_z V_\alpha - e_x S_\alpha \\ e_x e_z V_\alpha - e_y S_\alpha & e_y e_z V_\alpha + e_x S_\alpha & e_z^2 V_\alpha + C_\alpha \end{matrix}$$

$$e = (e_x, e_y, e_z)$$

$$V_\alpha = 1 - \cos\alpha$$

$$C_\alpha = \cos\alpha$$

$$S_\alpha = \sin\alpha$$

N is defined by assuming that $\alpha$=0

Figure 8:
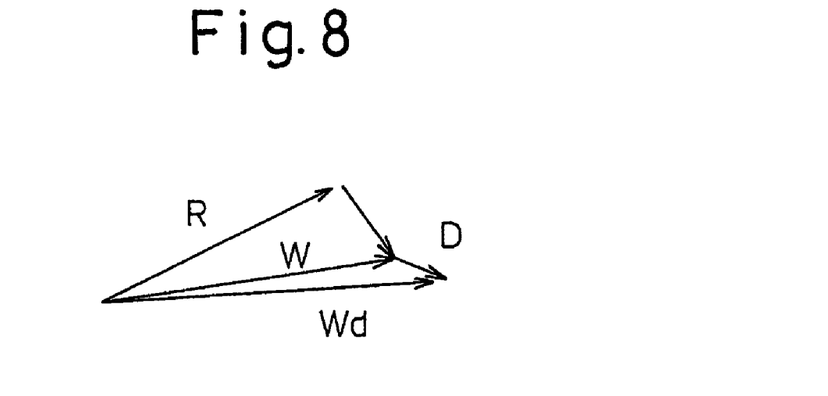
FIG. 8 is a diagram showing the relationship between robot position and workpiece position after correction.

FIG. 8 is a diagram showing the relationship between the position of the robot and the position of the workpiece after the above correction. Let the position of the robot before the correction be represented by a vector R and that of the workpiece by a vector W, and assume that the working surface Ps on the screen is displaced from the touchup surface Pt by a vector D; then, the work position vector Wd after the correction is the scalar product W.D of the vector W and the vector D, as shown.

Next, a description will be given of how the robot's D-H parameters are changed by the robot program correcting apparatus. The D-H parameters are known parameters that are set using the Denavit-Hartenberg convention.

The position and orientation of the TCP (Tool Center Point) of the robot is given by the multiplication of all the link matrices. The TCP is the position of the robot's end and is defined by three-dimensional coordinates.

In the first embodiment, if there are six axes of links, denoted by A1, A2, A3, A4, A5, and A6, respectively, and the tool matrix is denoted by T, then TCP is given as

TCP=A1A2A3A4A5A6T

When the layout of the workpiece is corrected, the working position dependent on the workpiece is also corrected automatically. At the same time, each teach point of the robot operation program on the robot program correcting apparatus is also corrected.

A comparison is further made between each teach point on the robot program correcting apparatus (on the screen) and its corresponding touchup point, and the difference is added to the link position and orientation ($\theta$, $\alpha$) defined by the robot's D-H parameters on the correcting apparatus.

A=(n, o, a, l)
n=(c$\theta$, s$\theta$, 0, 0)
o=(-c$\alpha$s$\theta$, s$\alpha$c$\theta$, s$\alpha$, 0)
a=(s$\alpha$s$\theta$, -s$\alpha$s$\theta$, c$\alpha$, 0)
l=(Ac$\theta$, As$^b$, s$\alpha$, 1)
where l denotes the location For each touchup point Ti(x, y, z, w, p, r) and I=1,n, where w, p, and r respectively denote the yaw, pitch, and roll angles known as the angles describing the orientation of the coordinate system, $\theta$t and $\alpha$t are calculated by solving the simultaneous equations Ti=A1iA2iA3iA4iA5iA6iT I=1,n For the working position on the screen, $\theta$s and $\alpha$s are obtained in like manner.

Difference $\theta d=\theta t-\theta s$, $\theta d=\alpha t-\alpha s$

These differences are added to the elements corresponding to the D-H parameters to correct the D-H parameters. The corrected parameters are used from the next time.

Next, a description will be given of how the robot operation program and working position closest to the touchup point are retrieved in the second embodiment.

First, from the set of touchup points, a spline curve is created by joining the points.

Similarly, from the set of teach points of the robot operation program, a spline curve is created by joining the points.

Touchup points Ti (xi, zi, zi, wi, pi, ri)
Teach points Ki (xi, yi, zi, wi, pi, ri)
The respective spline curves are given by Pti(t)=N0(t)Ti-1+N1(t)Ti+N2(t)Ti+1+N3(t)Ti+2

Pki(t)=N0(t)Ki-1+N1(t)Ki+N2(t)Ki+1+N3(t)Ki+2

Then, the difference between them is obtained, and the robot operation program that minimizes this difference is selected. Further, the working position corresponding to it is also selected.

It should be noted that the meanings of the terminologies used in claims are not limited to the meanings of the terminologies used in the DETAILED DESCRIPTION.

As is apparent from the above description, the present invention offers the following effects.

(1) Operation can be simplified when applying an off-line-created program to the field.

(2) The number of steps, that are required when applying an off-line created program to the field, can be reduced.

The invention claimed is:

1. A robot program correcting apparatus which displays three-dimensional models of a robot and a workpiece simultaneously on a screen of a display apparatus, and corrects an operation program for said robot, said apparatus comprising:

touchup position storing means for storing, as a plurality of points, an actual position located on said workpiece by actually operating said robot to touch said actual position on said workpiece that corresponds to a working position specified on said screen;

touchup line or touchup surface computing means for computing at least either a line or a surface based on said plurality of touchup points;

working position storing means for storing, as a plurality of points, position information concerning said working position on said workpiece displayed on said screen;

robot operation program retrieving means for retrieving said robot operation program based on said plurality of points stored in said working position storing means;

working position line or surface computing means for computing at least either a line or a surface based on a plurality of working positions designated by said robot operation program;

difference computing means for computing (i) a difference unit normal vector and (ii) an offset distance from a difference between (a) the surface calculated based on said working points and the surface calculated based on said touchup points, or between (b) the line calculated based on said working points and the line calculated based on said touchup points; and correcting means for correcting said robot operation program by computing the amount of correction based on said difference.

2. A robot program correcting apparatus as claimed in claim 1, further comprising:

operation program storing means for storing a plurality of robot operation programs by generating said programs based on positions of said robot and said workpiece arranged on said screen; and working position specifying means for specifying on said screen a working position at which said robot works on said workpiece arranged on said screen.

3. A robot program correcting apparatus as claimed in claim 1, wherein the line and the surface calculated based on said working points or based on said touchup points are a spline curve and a spline surface, respectively.

4. A robot program correcting apparatus as claimed in claim 1, wherein the amount of correction for said operation program is obtained by correcting a mechanism model of said robot based on said difference.

5. A robot program correcting apparatus as claimed in claim 4, wherein said mechanism model of said robot is a D-H parameter.

6. A robot program correcting apparatus which displays three-dimensional models of a robot and a workpiece simultaneously on a screen of a display apparatus, and corrects an operation program for said robot, comprising:

- touchup position storing means for storing, as a plurality of points, an actual position located on said workpiece by actually operating said robot to touch up said actual position on said workpiece that corresponds to a working position specified on said screen;
- means for retrieving, based on said touchup position, a robot operation program and working position associated with said touchup position;
- touchup line or touchup surface computing means for computing at least either a line or a surface based on said plurality of touchup points;
- working position line or surface computing means for computing at least either a line or a surface based on a plurality of points representing said retrieved working point;
- difference computing means for computing a difference between at least either said line or surface computed from said touchup points and at least either said line or surface computed from said points representing said retrieved working position; and
- correcting means for correcting said robot operation program by computing the amount of correction based on said difference.

7. A robot program correcting apparatus as claimed in claim 6, further comprising:

- operation program storing means for storing a plurality of robot operation programs by generating said programs based on positions of said robot and said workpiece arranged on said screen; and
- working position specifying means for specifying on said screen a working position at which said robot works on said workpiece arranged on said screen.

8. A robot program correcting apparatus as claimed in claim 6, wherein the line and the surface calculated based on said working points or based on said touchup points are a spline curve and a spline surface, respectively.

9. A robot program correcting apparatus as claimed in claim 6, wherein the amount of correction for said operation program is obtained by correcting a mechanism model of said robot based on said difference.

10. A robot program correcting apparatus as claimed in claim 9, wherein said mechanism model of said robot is a D-H parameter.

* * * * *